Feb. 26, 1963 R. L. BROWN ETAL 3,079,100

TAPE HANDLING APPARATUS

Filed Aug. 28, 1959 3 Sheets-Sheet 1

INVENTORS
RALPH L. BROWN
ROALD W. DIDRIKSEN
JOHANNES H. MORITZ
FRANCIS A. DICUS
BY Flehr & Swain
ATTORNEYS INVENTORS
RALPH L. BROWN
ROALD W. DIDRIKSEN
JOHANNES H. MORITZ
BY FRANCIS A. DICUS
Flehr & Swain
ATTORNEYS

TAPE HANDLING APPARATUS

Filed Aug. 28, 1959 3 Sheets-Sheet 3

INVENTORS
RALPH L. BROWN
ROALD W. DIDRIKSEN
JOHANNES H. MORITZ
BY FRANCIS A. DICUS

Flehr & Swain
ATTORNEYS 3,079,100
Patented Feb. 26, 1963

3,079,100

TAPE HANDLING APPARATUS

Ralph L. Brown, San Francisco, Roald W. Didriksen, Sunnyvale, Johannes H. Moritz, Los Gatos, and Francis A. Dicus, Cupertino, Calif., assignors to Ampex Corporation, Redwood City, Calif., a corporation of California Filed Aug. 28, 1959, Ser. No. 836,807
4 Claims. (Cl. 242—55.12)

This invention relates generally to a brake release for torque motors and more particularly to a brake release for torque motors which drives supply and take-up reels in magnetic tape recording and reproducing apparatus.

The tape transport of recording and reproducing apparatus, for example, magnetic tape apparatus, generally includes supply and take-up reels with the tape extending between the supply and take-up reels. The tape is threaded over one or more idler rollers (one of which may be carried on a compliance arm), past a recording and reproducing head assembly, through a capstan drive, over one or more rollers (one of which may be carried on a compliance arm), and onto the other reel. In general, torque motors serve to drive the take-up and supply reel turntables whereby the tape is supplied from the supply reel and wound onto the take-up reel as it is driven past the rotating head assembly by the capstan drive.

Brakes are generally associated with supply and take-up turntables for stopping the reels and for controlling the tension in the tape. The fundamental consideration of a braking system is that the braking force acting on the turntable from which the tape is being pulled (the trailing turntable) must always exceed the braking force acting on the turntable taking up the tape (the leading turntable) to prevent the throwing of tape loops. Furthermore, the braking system is such that if there is a loss of power, the brakes are automatically applied to stop the motion of the turntables and to prevent throwing of tape loops.

The torque motors are de-energized when the machine is at standby and the brakes are applied to prevent turning of the turntables. Consequently, when threading machines, the relatively large braking force must be overcome to thread the tape through the machine. In machines employing relatively narrow tapes, small braking forces are present. However, in machines which employ relatively wide magnetic tape and relatively large braking surfaces, the forces which must be overcome may be considerable, making it difficult to thread the machine.

It is, therefore, a general object of the present invention to provide a tape transport apparatus which includes means for releasing the brakes for threading the machine.

It is another object of the present invention to provide a means associated with the compliance arm of the tape machine for releasing the braking effort when the compliance arm is moved to a predetermined position.

These and other objects of the invention will become more clearly apparent from the following description when taken in conjunction with the accompanying drawings.

Referring to the drawings.

Figure 1:
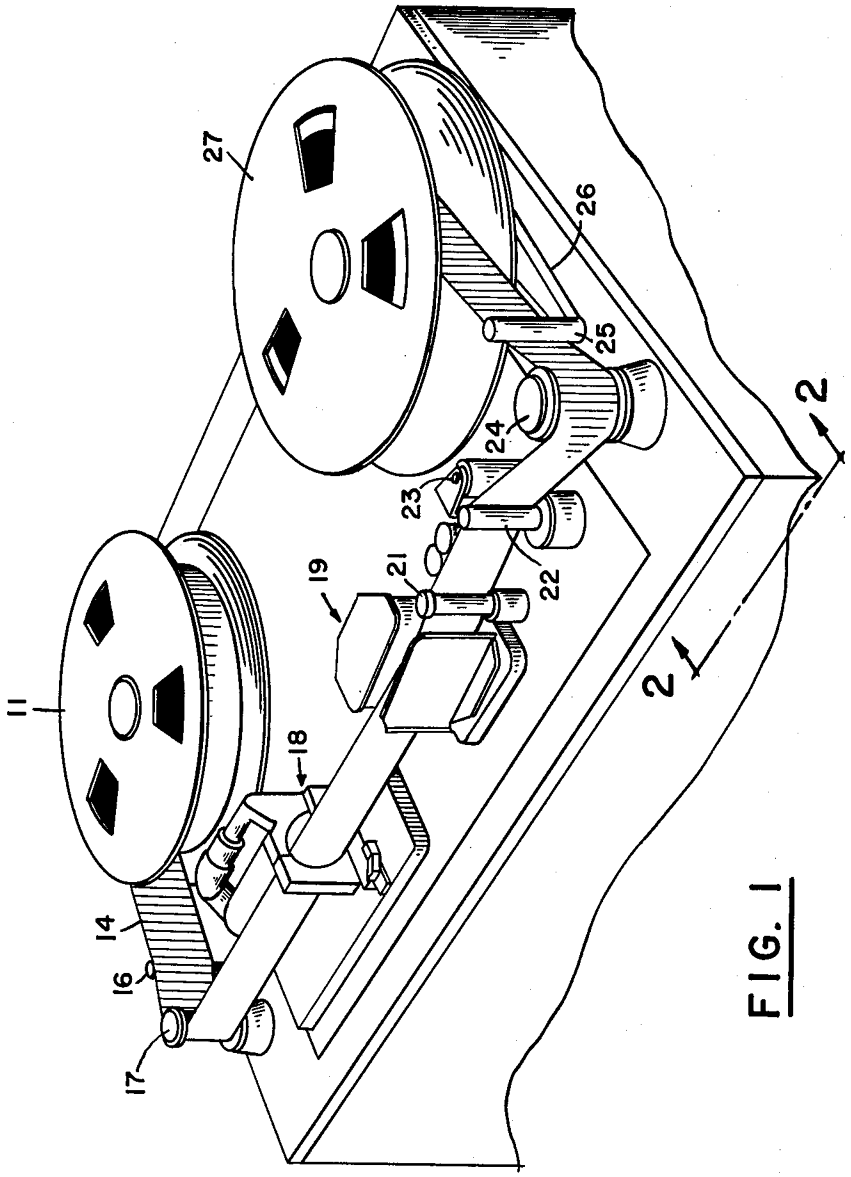
FIGURE 1 is a perspective view showing a tape transport apparatus incorporating the present invention.
Figure 2:
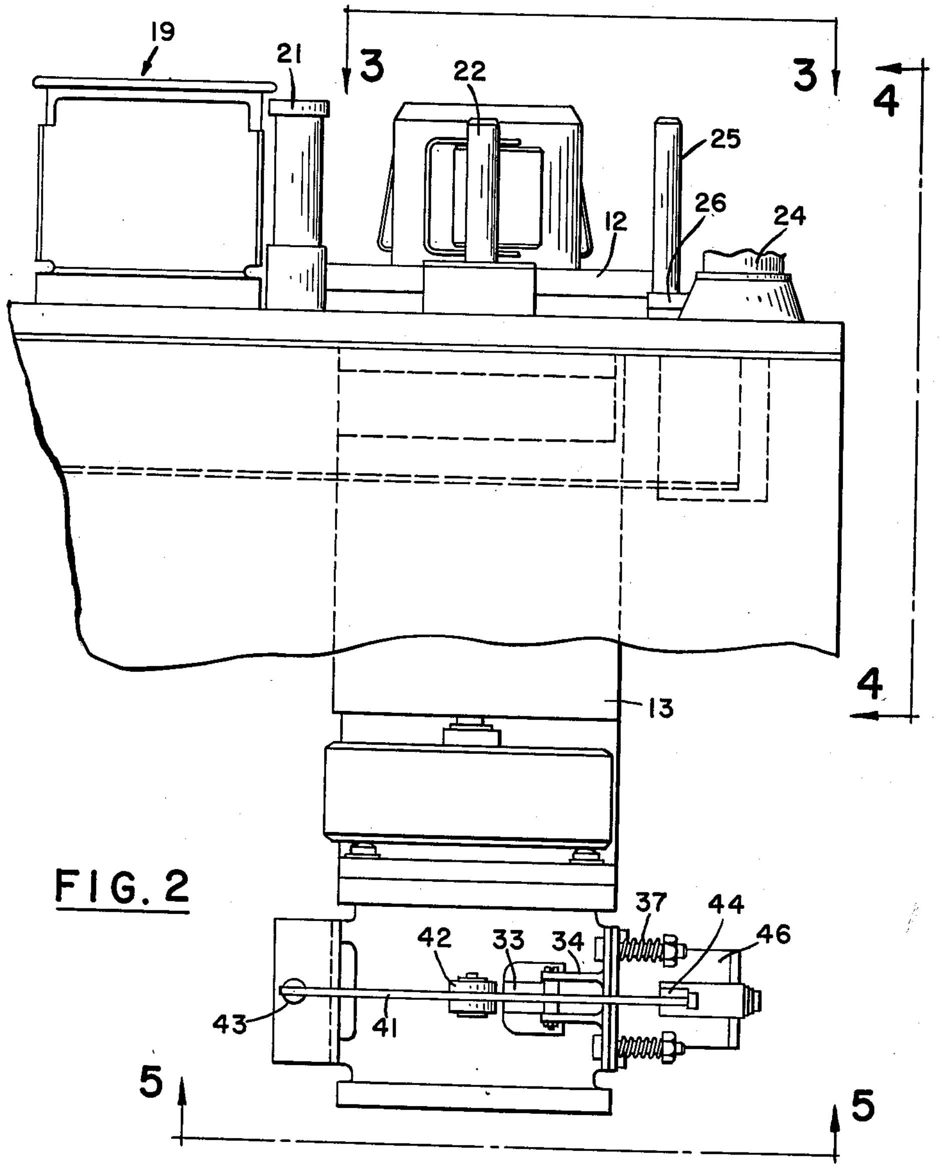
FIGURE 2 is an elevation view, partly in section, taken as indicated by the line 2—2 of FIGURE 1.
Figure 4:
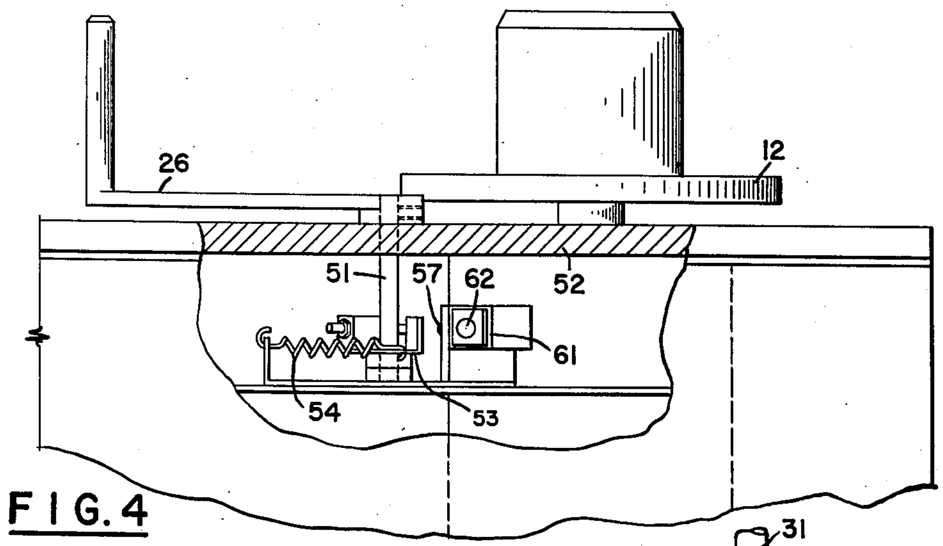
FIGURE 4 is an elevational view, partly in section, taken as indicated by the line 4—4 of FIGURE 2.

Referring to FIGURE 1, a perspective view of a recorder of the type described in Patent No. 2,866,012 is illustrated. The tape is supplied from a supply reel 11 which is carried by a turntable 12 (FIGURE 4) which is driven by a torque motor 13 (FIGURE 2). The supply reel supplies the tape 14 which is threaded past a roller 16 carried by a compliance arm (not shown) over an idler 17, past a rotating transducing head assembly 18 of the type described in said patent, past sound and control track erase, and sound and control track record and/or reproduce head assembly 19, over a guide 21, and past a capstan 22 which is driven by capstan motor (not shown). A capstan idler 23 acts in conjunction with the capstan to hold the tape in engagement with the capstan. The tape then passes over an idler 24, past a second compliance roller 25 carried by the compliance arm 26. The tape is then received by the take-up reel 27 which is likewise carried on a turntable of the type shown in FIGURE 2 driven by a torque motor 13.

Figure 5:
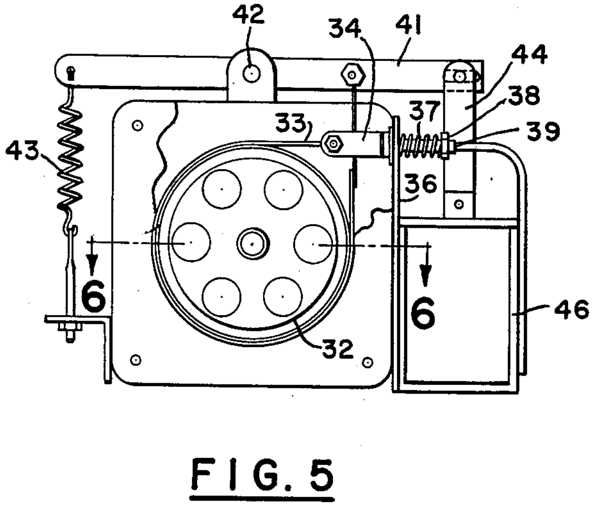
FIGURE 5 is a bottom view taken as indicated by the line 5—5 of FIGURE 2.
Figure 6:
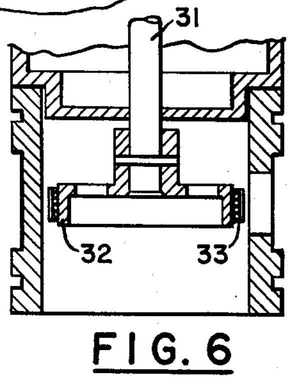
FIGURE 6 is a sectional view taken along the lines 6—6 of FIGURE 5.

The torque motor 13 includes a shaft 31 which extends downwardly (FIGURES 2 and 6) and carries a brake drum 32. Referring more particularly to FIGURES 5 and 6, a brake band 33 engages the brake drum and is secured at one end by a link 34 which extends through the plate 36 and receives a spring 37. A nut 38 holds the spring on the shaft portion 39. The nut 38 is adjustable to control the tension on the brake band 33. The other end of the brake band is secured to the brake lever 41. The lever is pivoted at 42. A brake tension spring 43 engages one end of the lever and serves to urge the lever 41 in a direction so as to apply braking force.

The other end of the lever is engaged by the armature 44 of solenoid 46. By energizing the solenoid 46, the armature is drawn downwardly releasing the brake, as for example, during normal operation of the machine. When the solenoid is de-energized as by switching the machine to standby or by a power failure, the brakes are automatically applied. The braking effort is controlled by adjustment of the springs 37 and 43.

A similar braking apparatus and solenoid 46 is provided for the supply reel. When the brake solenoid is de-energized, the brake tension spring acting on the brake lever 41 draws the band against the brake drum. If the drum is rotating in a counter-clockwise direction (referring to the supply assembly), the frictional forces will cause the band to be self-energizing wrapping it more tightly about the drum. If the drum is rotating in the clockwise direction, the band will tend to pull away from the drum releasing the brake. In the counter-clockwise rotation of the drum, the braking force will be increased, and in the clockwise rotation, the braking force is decreased. The ratio of the braking force in one direction to the braking force in the other is called the brake differential. The differential provides a safety feature which prevents throwing of the tape upon sudden failure of power. During the forward mode of tape operation, to stop the tape, the two solenoids 46 are both de-energized at the same instant. The brakes are arranged so that the supply reel brake applies its greatest braking force, while the takeup reel brake applies its smallest braking force, thus preventing throwing of the tape. During reverse operation, the roles of the brakes are reversed, and so are the braking forces.

The machine is threaded when it is at standby. The brakes are applied. Thus, in order to thread the machine, the braking effort must be overcome.

Figure 3:
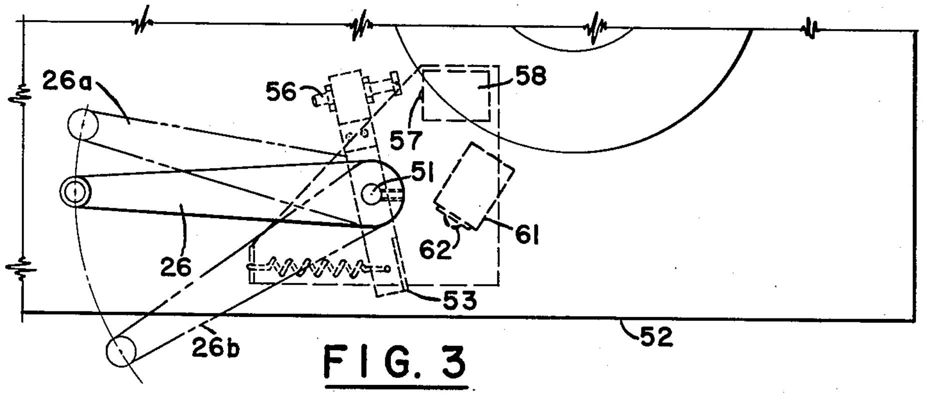
FIGURE 3 is a plan view of a portion of the machine showing the location of the switching elements associated with the compliance arm, taken as indicated by the line 3—3 of FIGURE 2.

In accordance with the present invention, means are provided for automatically releasing the brakes associated with the turntables. The compliance arm 26 (FIGURES 3 and 4) includes a shaft 51 which extends down through the top plate 52 of the tape transport. The shaft 51 carries a lever 53 which is engaged at one end by a spring 54 which provides a clockwise force. The force is transmitted through the shaft to the compliance arm 26 whereby the compliance arm is urged in a clockwise direction. The roller 25 presses against the tape to maintain substantially constant tension in the tape loop.

One end of the lever 53 is provided with an adjustable screw 56 which is adapted to engage the button 57 of a switch 58. In the event of tape breakage, the arm rotates in a clockwise direction as viewed in FIGURE 3, to the position shown by dotted outline **26*a* so as to activate the switch 58. The switch is connected in the torque motor power circuit and automatically serves to turn off the power to the torque motors. Additionally, the switch 58** can be connected to drop out the capstan idler and remove power from the capstan motor in the event of tape breakage. Consequently, upon tape breakage, all tape driving means is de-energized. The brakes are automatically applied in the event of tape breakage.

A second switch 61 including an activating button 62 is disposed whereby the other end of the lever 53 engages the button 62 when the arm is urged outwardly against the tension of the spring. The switch 61 is connected in the power circuit and energizes the brake solenoids when it is activated. Thus, when the compliance arm is moved outwardly to its limit of travel (indicated by dotted line **26*b***), the solenoids are energized, the brakes are released, and the reel turntables are free to rotate. This permits easy threading. As soon as the machine has been threaded, the arm is urged back to engage the tape and again act as a compliance arm.

Although the switches 58 and 62 are described and shown associated with the compliance arm 26 on the take-up side of the transport it is obvious, and in some instances may be advantageous, to associate these switches with the compliance arm on the supply side of the transport.

Figure 7:
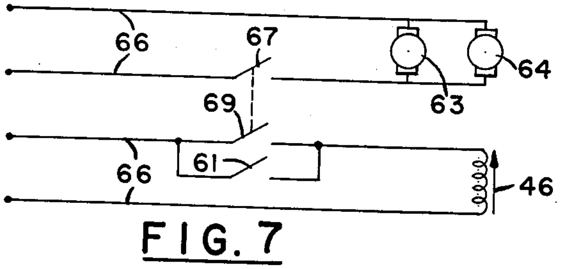
FIGURE 7 is a circuit diagram showing the power control circuits associated with the torque motors of the take-up and supply reels.

FIGURE 7 shows a schematic diagram of one embodiment of the invention. Torque motors 63 and 64 for the take-up and supply reels are connected to a source of A.-C. voltage 66, through the switch 67. The brake solenoid 46 is connected to a source of D.-C. voltage through the parallel switches 61 and 69. Switch 69 is mechanically ganged to the switch 67.

When closing the switch 67 to supply power to the torque motors 63 and 64, the switch 69 is simultaneously closed thereby providing D.C. current to the brake release solenoid 46. During the threading operation, the motors 63 and 64 are naturally turned off. Consequently the switch 67 and its gang switch 69 will be open. In order to relieve the brake, the switch 61 which is activated by the compliance arm 26 (FIGURE 3) is closed. The brake is thereby released for easy threading of the tape.

Thus, it is seen that the compliance arm has a novel operating position which lies between two extreme positions. One of the extreme positions serves to cut off power to the torque motors and the brake solenoid in the event of tape breakage, thereby to prevent spillage of tape. The other extreme position serves to energize solenoids to release the brakes for easy threading.

We claim:

1. In a tape transport of the class in which a tape is coiled upon and is threaded between a pair of reels, the combination comprising: motor and brake means coupled to said reels for the operation thereof and including a motor energizing circuit and a brake release circuit therefor and first and second switches coupled respectively in said circuits, said means having a first mode of operation wherein said brake release circuit and said motor energizing circuit are both energized to cause said motor to apply positive impelling torques to said reels to tension said tape and to transfer said tape from one reel to another, a second mode of operation wherein said motor energizing and brake release circuits are both de-energized to cause said reels to stop and to remain stationary, and a third mode wherein said motor energizing circuit is de-energized and said brake release circuit is energized to release at least one of said reels for free rotation, said switches being ganged and being manually operable for shifting said means between the first and second modes thereof; and means coupled to said first-named means for further controlling the operation thereof in accordance with the disposition of said tape, said last-named means including a compliance arm engaged and held by said tape in a first position when said tape is threaded, said arm in said first position being operative to tension said tape but inoperative with respect to said first and second switches so as to permit manually controlled operation of said first-named means in the first and second modes thereof, said arm being provided with means urging said arm into engagement with said tape and toward a second position in which said arm is operative with respect to said switches to de-energize said circuits for causing said first-named means to operate only in the second mode when said tape becomes unthreaded, said brake release circuit being provided with a third switch coupled in parallel with said second switch thereof and said arm being manually movable to a third position engaging and closing said third switch to energize said brake release circuit and to cause said first-named means to operate only in the third mode, whereby at least one of said reels is released for manual rotation to facilitate threading of said tape.

2. In a tape transport of the class having a tape coiled upon a pair of reels, and motors for driving said reels, the combination comprising: brake means for said reels, means for urging said brake means toward engaged position, and means for releasing said brake means; means for energizing said motors; a pivoted and spring loaded tape tension arm having a tensioning position engaging and tensioning said tape under the urging of said spring loading; means operable by said arm at the extreme limit of rotation of said arm as urged by said spring loading to deactuate said brake-release and motor energizing means; and means operable by said arm at the extreme limit of rotation of said arm against the urging of said spring loading to actuate said brake-release means alone.

3. In a tape transport of the class having a tape coiled upon a pair of reels and motors for driving said reels, the combination comprising: brake means spring loaded toward engaged position with said reels, and means for releasing said brake means; means for energizing said motors; a pivoted and spring loaded tape tension arm having a tensioning position engaging and tensioning said tape under the urging of said last-named spring loading; means positioned to be encountered by said arm at the extreme limit of rotation thereof as urged by said last-named spring loading, said last-named means being operable by said arm to deactuate said brake-release and motor energizing means; and means positioned to be encountered by said arm at the extreme limit of rotation thereof against the urging of said last-named spring loading, said last-named means being operable by said arm to actuate said brake-release means alone.

4. In a tape transport of the class having a tape coiled upon a pair of reels and motors for driving said reels, the combination comprising: brake means spring loaded toward a position of engagement with said reels and solenoid means for releasing said brake means against the urging of said spring loading; a circuit for energizing said motors; a circuit for energizing said solenoid means; a pivoted and spring loaded tape tension arm having a tensioning position engaging and tensioning said tape under the urging of said last-named spring loading; a pair of ganged switches positioned to be encountered by said arm at the extreme limit of rotation therefore as urged by said last-named spring loading, one of said switches being connected in said solenoid energizing circuit and the other switch being connected in said motor energizing circuit, both of said switches being normally closed and being operable by said arm to open and to de-energize said motors and said solenoid means; and a third switch positioned to be encountered by said arm at the extreme limit of rotation thereof against the urging of said spring loading, said third switch being normally open and in parallel with said solenoid ganged switch so as to be operable by said arm to close and to energize said solenoid means.

References Cited in the file of this patent

UNITED STATES PATENTS

| | | |
|---|---|---|
| 1,964,874 | Fankboner | July 3, 1934 |
| 2,598,950 | Walker | June 3, 1952 |
| 2,687,882 | Pettus | Aug. 31, 1954 |
| 2,869,684 | Tarbuck | Jan. 20, 1959 |

FOREIGN PATENTS

| | | |
|---|---|---|
| 716,409 | France | Oct. 6, 1931 |